(12) United States Patent
Selig et al.

(10) Patent No.: US 6,903,280 B2
(45) Date of Patent: Jun. 7, 2005

(54) VEHICLE SEAT

(75) Inventors: Klaus Peter Selig, Balingen-Weilstetten (DE); Stephen Vogler, Messstetten (DE)

(73) Assignee: Bizerba GbmH & Co. KG, Balingen (DE)

(*) Notice: Subject to any disclaimer, the term of this patent is extended or adjusted under 35 U.S.C. 154(b) by 0 days.

(21) Appl. No.: 10/699,177

(22) Filed: Oct. 31, 2003

(65) Prior Publication Data

US 2004/0140137 A1 Jul. 22, 2004

Related U.S. Application Data

(63) Continuation of application No. PCT/EP02/04825, filed on May 2, 2002.

(30) Foreign Application Priority Data

May 1, 2001 (DE) .......................................... 101 20 977

(51) Int. Cl.$^7$ ............................ B60R 21/22; G01G 19/52
(52) U.S. Cl. .......................... 177/144; 180/273; 280/735
(58) Field of Search ......................... 180/273; 280/735; 340/667; 701/45; 177/136, 144, 201 R (56) References Cited

U.S. PATENT DOCUMENTS

| | | | |
|---|---|---|---|
| 4,678,050 A | | 7/1987 | Wirth et al. .................. 177/229 |
| 5,183,124 A | | 2/1993 | Borchard ................ 177/210 FP |
| 5,183,125 A | | 2/1993 | Schurr ......................... 177/211 |
| 5,243,146 A | * | 9/1993 | Nishitani ..................... 177/136 |
| 5,739,757 A | | 4/1998 | Gioutsos ...................... 340/667 |
| 5,785,347 A | * | 7/1998 | Adolph et al. ............... 280/735 |
| 5,892,181 A | * | 4/1999 | Takahashi .................... 177/136 |
| 6,070,115 A | * | 5/2000 | Oestreicher et al. .......... 701/45 |
| 6,129,168 A | | 10/2000 | Lotito et al. ................. 180/273 |
| 6,293,585 B1 | * | 9/2001 | Bruns et al. ................. 280/735 |
| 6,323,443 B1 | | 11/2001 | Aoki et al. .................. 177/144 |
| 6,323,444 B1 | * | 11/2001 | Aoki ........................... 177/144 |
| 6,342,683 B1 | * | 1/2002 | Aoki et al. .................. 177/144 |
| 6,448,512 B1 | * | 9/2002 | Cooper ........................ 177/144 |
| 6,571,647 B1 | | 6/2003 | Aoki et al. ............. 73/862.381 |
| 6,725,165 B1 | * | 4/2004 | Knox et al. .................... 702/42 |

FOREIGN PATENT DOCUMENTS

| | | |
|---|---|---|
| DE | 38 09 074 A1 | 10/1989 |
| DE | 44 20 691 C1 | 1/1996 |
| DE | 199 25 877 A1 | 1/2000 |
| DE | 198 52 541 C1 | 3/2000 |
| DE | 100 11 371 A1 | 9/2000 |
| EP | 0 950 560 A | 10/1999 |
| EP | 0 955 203 A | 11/1999 |
| JP | 09150662 A | 6/1997 |

* cited by examiner

*Primary Examiner*—Randy W. Gibson
(74) *Attorney, Agent, or Firm*—Leydig, Voit & Mayer, LTD (57) ABSTRACT

In order to develop a vehicle seat with a seat frame for the mounting of a sitting area and with a supporting frame, which keeps the seat frame at a predetermined distance from the vehicle floor and connects the vehicle seat to the vehicle floor, in such a way that the seat supplies information on the weight of the occupants which is substantially uninfluenced in particular by the conditions which are very difficult in terms of measuring technology and the other special ambient conditions within a vehicle, it is proposed that the supporting frame comprises a height-adjusting device, in order to vary the distance of the seat frame from the vehicle floor in a defined way, that at least three load cells which respond to a weight acting on the sitting area and supply a signal corresponding to the weight are disposed at the corner points of an imaginary polygonal area, the signal corresponding to a weight resulting from a distance measurement, and that the load cells respectively have a one-piece force transducer with an elastically deformable part and a non-deforming part, the non-deforming part being fixed to the frame and the elastically deformable part being secured at a pivot point of the height-adjusting mechanism, or vice versa.

15 Claims, 4 Drawing Sheets

VEHICLE SEAT

The present invention relates to the subject matter disclosed in German application No. 101 20 977.0 of May 1, 2001, which is incorporated herein by reference in its entirety and for all purposes. This application is a continuation of PCT/EP02/04825, filed May 2, 2002, which claims priority to German application No. 101 20 977.0.

BACKGROUND OF THE INVENTION

The invention relates to a vehicle seat with a seat frame for the mounting of a sitting area and with a supporting frame, which keeps the seat frame at a predetermined distance from the vehicle floor and connects the vehicle seat to the vehicle floor.

In the course of introducing airbags as standard for the passenger seat in motor vehicles there arises the problem of detecting the occupancy of the seat, so that the passenger airbag is released for firing only in those cases in which the seat is occupied. Firing of the passenger airbag when the passenger seat is not occupied not only has the consequence that an additional increase in pressure in the vehicle is unnecessarily caused in the event of an accident by the firing of the passenger airbag, but also that, due to the integration of the passenger airbag into the dashboard, considerable repair measures are necessary in the passenger compartment of the vehicle following firing of the airbag.

Various problems which have been observed when airbags are fired with small children or youngsters traveling on the passenger seat have ultimately led to the requirement that, in the event of an accident, an airbag must be operated in a way which is adapted to the person sitting on the vehicle seat.

This gives rise to the problem of determining the necessary data for firing the airbag in a way appropriate for requirements.

One possible reference point is to detect the weight of the respective vehicle occupant, the size and physical robustness of the occupant then being concluded on the basis of a weight determination.

U.S. Pat. No. 5,739,757 proposes using sensors incorporated in the seat cushion of a vehicle seat to determine the weight of the vehicle occupant and to fire the airbag in accident situations only in the case in which a lower weight limit is exceeded. In addition, the position of the occupant on the seat is determined, so that the airbag can be switched off if the occupant is too close to the airbag for safe firing. Recommended in this case as sensors are ferromagnetic elements which change their magnetic permeability under the horizontal tensile loading occurring here.

It is a disadvantage of this solution that changes in the spring constant of the seat suspension (aging, use) lead to an additional zero drift of the weighing signal of the sensor elements. In addition, considerable measuring errors occur when the vehicle accelerates or decelerates, and have to be corrected in a complex way. An adverse effect of these measuring errors is that they correspond to interference signals with a long period/low frequency. As a result, a more time-consuming correction has to be performed, making the measuring system intrinsically slow to respond. In addition, when the vehicle is inclined, a great measuring error is obtained, and can only be corrected with considerable effort.

DE 38 09 074 A1 proposes disposing weight sensors in the region of the seat rail of the vehicle seat to determine the sitting position or position of the center of gravity of the vehicle occupant and to decide according to the sitting position whether the airbag is partly or fully fired and deployed in an accident situation. Recommended quite generally here are inductive sensors, with no recommendation being given for the actual construction of the sensors.

A particular disadvantage of this solution is that the seat rails have to be disposed higher above the floor of the vehicle than would otherwise be necessary without the sensors. This, however, impairs the headroom for the occupants of the vehicle.

In terms of measuring technology, the vehicle interior is extremely problematical, since not only do interference signals of the engine ignition occur to a considerable extent and have to be eliminated in signaling terms, but it is also necessary with respect to the functional capability of sensors that are to be used to take into account extreme temperature conditions in a range from, for example, $-40$ to $+85°$ C. and also atmospheric humidity ranging right up to the dew point.

Furthermore, account must be taken of the fact that not only the weights of the occupants act on the seat but also, when the vehicle accelerates and, in particular, decelerates suddenly, forces which are many times greater, not to mention the forces occurring in an accident situation, which likewise must not lead to malfunctioning of the sensors.

As well as this there are the various adjusting possibilities for a vehicle seat which are provided in modern motor vehicles and may only influence the measuring result within defined limits.

SUMMARY OF THE INVENTION

It is therefore an object of the invention to develop a vehicle seat of the type described at the beginning in such a way that the seat supplies information on the weight of the occupants which is substantially uninfluenced in particular by the conditions which are very difficult in terms of measuring technology and the other special ambient conditions within a vehicle, and in such a way that the overall height of the vehicle seat remains substantially unchanged.

This object is achieved in the case of the vehicle seat stated at the beginning according to the invention by the supporting frame comprising a height-adjusting device, in order to vary the distance of the seat frame from the vehicle floor in a defined way, by at least three load cells which respond to a weight acting on the sitting area and supply a signal corresponding to the weight being disposed at the corner points of an imaginary polygonal area, the signal corresponding to a weight resulting from a distance measurement, and by the load cells respectively having a one-piece force transducer with an elastically deformable part and a non-deforming part, the non-deforming part being fixed to the frame and the elastically deformable part being secured at a pivot point of the height-adjusting mechanism, or vice versa.

On account of the load cell or the load cells being disposed at pivot points of the height-adjusting mechanism, there is obtained a weight signal which is independent of the position in which the vehicle seat happens to be at the time, seen in the longitudinal direction of the vehicle, and also allows further adjusting possibilities of the seat, for example height adjustment, setting the inclination of the backrest, pivoting the sitting area about an axis transverse to the longitudinal direction of the vehicle etc., without the measuring signal being falsified to an inadmissible extent as a result.

In particular, vertically introduced forces are measured, with the preference that interfering forces, which in the case of this solution take the form in particular of vibrations or shocks caused by an uneven roadway, can be corrected relatively simply, for example by mean-value formation, since the frequency of the interference signals is great and averaging periods of, for example, 1 s already achieve adequate results. Vehicles which are inclined cause a much smaller measuring error than is the case when measuring horizontally acting forces.

The one-piece construction of the force transducer allows a simple, very stable and spatially compact type of construction and at the same time offers the assurance of reliable measured values.

The decision to obtain the measured values by means of distance measurement has the advantage that a greater measuring path is available in comparison with strain measurement. This is of particular significance when mechanical overload protection is used.

In this case, either the seat frame may be connected to the non-deforming part of the force transducer and the supporting frame connected to the elastically deformable part, or else vice versa, the seat frame connected to the elastically deforming part of the force transducer and the supporting frame connected to the non-deforming part of the force transducer, so that the force transducer preferably has a direct connection between the seat frame and the supporting frame.

Expressed more generally, according to the invention the non-deforming part may incorporate a pivot point of the height-adjusting mechanism and the elastically deformable part be disposed and secured in such a way that it is fixed to the frame or else the elastically deforming part may incorporate a pivot point of the height-adjusting mechanism and the non-deforming part be disposed and secured in such a way that it is fixed to the frame.

The choice of the one pivot point of the height-adjusting mechanism (for example the pivot point alongside the seat frame or the pivot point alongside the vehicle floor or else the pivot point disposed on the seat rail) may be made on the basis of the structural conditions of the seat and or of the vehicle. The aforementioned attainable advantages are achieved in each of these cases.

Preferably, load cells with inductively operating force transducers are used in this case. Inductively operating force transducers can be constructed in such a way that they are very insusceptible to interference and in particular able to withstand extreme mechanical loading, which is of special significance in the case of a motor-vehicle seat, since great forces can act on the seat even in normal driving operation, during acceleration and deceleration. In the event of an accident, the forces acting on the load cell are many times greater by a considerable amount.

A sensor element operating on the eddy current principle is used with preference. Also preferred are those sensor elements in which the weighing signals occur analogously to frequency, since in this case a particularly great and interference-immune signal is obtained. These sensor elements have the further advantage that the weighing signals can be evaluated and further processed in a simple manner.

Most preferred is the provision of four load cells.

The overall height or the so-called hip point of a vehicle seat is of interest because it constitutes part of a vehicle registration and is an indirect measure of the headroom of the vehicle. Changing the hip point beyond an amount which is fixed—according to the vehicle type—inevitably means that a change which necessitates either a change of the vehicle design or a change of the registration of the vehicle is made.

When three or more load cells are used, shifts of the center of gravity of the person sitting on the vehicle seat can in addition also be registered and taken into account in the evaluation of the weighing signals.

This is of significance in particular because the feet of an occupant, generally placed on the vehicle floor, cause so-called force bypasses, so that weight signals which falsely indicate a lower weight than actually corresponds to the body weight of the occupant are obtained.

By means of the center-of-gravity determination and the individual signals of the individual load cells or the evaluation, this fact can be taken into account and assessed differently, in particular also in dependence on the respective individual seat setting. The result of the center-of-gravity determination additionally also allows a conclusion to be drawn as to the position of the occupant in relation to the airbag position, and consequently the risk to the occupant if the airbag is fired to be estimated.

Disregarding changes which are caused by force bypasses, no significant influence on the signal which is generated and made available by the load cell is found when the vehicle seat according to the invention is adjusted in the longitudinal direction; even when the height adjustment is made, the weighing signal remains uninfluenced in the above sense on account of the load cell(s) being disposed in the way according to the invention.

To be able to carry out various case scenarios and correction measures to come as close as possible to the body weight of the occupant in spite of all the problems presented above, the load cells are connected to an evaluation circuit, which preprocesses weighing signals received by the load cells and provides an output signal at an interface for the electronics of the vehicle.

This allows the signals from a number of load cells to be processed and consequently a uniform output signal to be provided for the electronics of the vehicle. In this case, an averaging of the weighing signals detected over the time period may also be performed, in order in this way to arrive at more stable measured values.

An output signal which indicates in which of a number of predefined weight classes the occupant sitting on the seat is to be categorized is preferably provided.

In this way, the activation of airbags which can be fired in stages is distinctly simplified, since the actual evaluation and ascertainment of the type of function of the airbag can already be integrated into the evaluation circuit.

On account of the extreme temperature fluctuations in the interior of a vehicle, which can easily exceed a temperature span of 80° C., it is preferred to connect the evaluation circuit to a temperature sensor, the temperature signal of the latter being received by the evaluation circuit and used for the temperature correction of the weighing signals.

In the case of a particularly preferred embodiment of the present invention, the measured temperature values are in each case detected alongside the load cells, since, in particular in the case of the load cells lying in the interior of the vehicle, different temperature conditions may arise than in the case of those disposed alongside the body of the vehicle.

The evaluation circuit can then also assume the function of ascertaining the center of gravity of the weight of the occupant on the sitting area, for example when four load cells are used, it being possible to derive various corrections from this. This is so because the center of gravity will shift depending on which sitting position the occupant assumes on the seat, and on this basis not only the correction of the force bypasses can then be adapted, but also the potential risk to the occupant when the airbag is put into operation can be better estimated and taken into account.

Furthermore, the evaluation circuit may comprise a diagnostic unit, which performs a check on the functional capability of the load cells at predetermined time intervals or else when predetermined events occur, for example when the motor vehicle is opened. In this way it can be promptly detected whether one of the load cells is producing inconsistent values and so must not be taken into account any longer in a determination of the weight of occupants.

At the same time, in such a case a warning message which draws the attention of the driver of the motor vehicle to this fact can then also be generated, so that this defect can be rectified as quickly as possible.

In addition, the evaluation circuit may be provided with a memory unit, which may serve for recording the weighing signals of the measuring cells over a predetermined time period and/or recording the output signals and/or the temperature signals.

This not only allows the drift of the signals of the individual load cells to be monitored over quite long time periods, and consequently a zero-point adaptation to be automatically carried out, but also makes it possible to differentiate between zero drift and the placing of objects on the passenger seat, for example a briefcase. Furthermore, this also makes it more easily possible to discover a defect of one of the load cells.

The memory unit will preferably store results of the preprocessing of the weighing signals, of the diagnostic unit, of the signals of the temperature sensor or the temperature sensors and/or peak loading values of the seat frame, possibly together with a time signal.

In such a case the possibility is obtained of evaluating the recorded signals in the case of an accident and consequently drawing conclusions as to the sequence of events and possibly even the causes of an accident.

The vehicle seat according to the invention preferably has a mechanical overload protection, which limits the relative movement of the elastically deformable parts of the force transducers with respect to the non-deforming parts.

In comparison with a mechanical overload protection disposed on the force transducer itself, the preference here for it to be disposed on the vehicle seat has the advantage that the force transducer, and consequently the load cell as a whole, can be protected even in instances of very great shock-like loading.

What is more, the production method for the one-piece force transducer is simplified.

Furthermore, this measure allows the force transducer to be configured as compactly as possible, since the mechanical overload protection does not have to be integrated. On the other hand, is also provides greater freedom in the configuration and arrangement of the mechanical overload protection. On account of the measuring principle selected according to the invention, that of monitoring changes in distance and the resultant relatively great measuring paths, a mechanical overload protection can be realized in a relatively simple and low-cost way, since tolerances of the same order of magnitude as the mechanical measuring paths (for example 1 to 2 mm) can be maintained without any problem in production engineering terms. Mechanical overload protections of this type are simple to accomplish in production engineering terms with the tolerances to be demanded and do not require arrangements for adjustment.

The overload protection preferably comprises a stop in the direction of loading and in the direction of loading relief, so that typical overload situations, such as for example rear-end and front-end collision situations, can be handled without the force transducer being damaged.

With respect to the structural design, it is simplest for the stop or stops to be disposed on the seat frame or supporting frame.

These and further advantages of the invention are specifically explained in still more detail below on the basis of the drawings, in which specifically:

DETAILED DESCRIPTION OF THE INVENTION

Figure 1A:
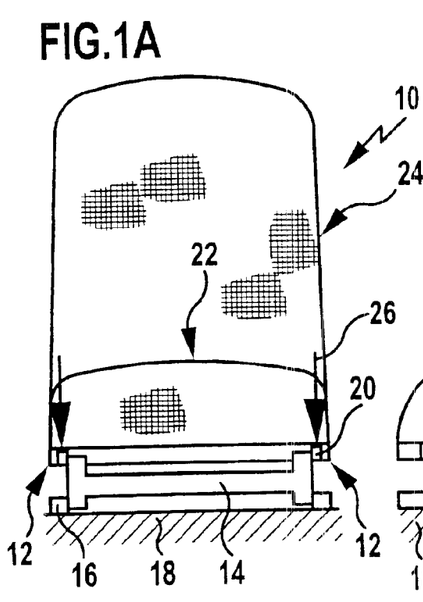
FIGS. 1A and 1B show a schematic representation in front view and side view of a vehicle seat according to the invention.
Figure 1B:
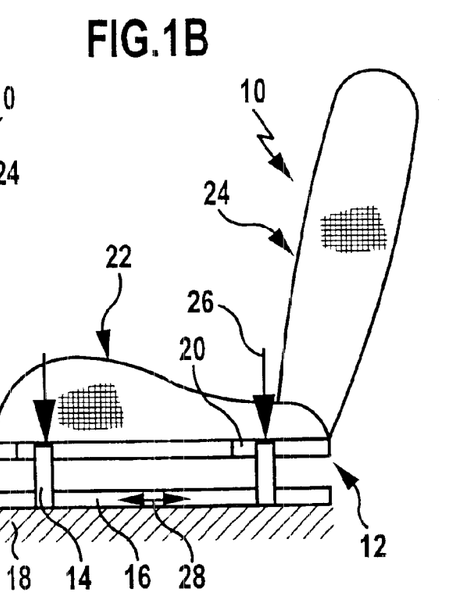

FIGS. 1A and 1B show a vehicle seat 10 with a seat frame 12 and a supporting frame 14, the vehicle seat 10 being secured to rails 16 on a vehicle floor 18 by means of the supporting frame 14. On the rails 16, the seat 10 can be made to move in the longitudinal direction of the vehicle, and consequently the distance of the seat from the dashboard or steering wheel can be adjusted.

In the present example of FIGS. 1A and 1B, the seat frame 12 is kept at a defined distance above the vehicle floor 18 at four points by the supporting frame 14. At the location of the connection of the seat frame 12 to the supporting frame 14, according to the invention four load cells, which in the present case are configured as inductive load cells, are disposed. These locations are formed at the same time as pivot bearings of a height-adjusting mechanism. Held on the seating frame 12 is a sitting area 22 and articulated on it is a backrest 24. As can be seen from FIGS. 1A and 1B, a weighing signal does not change on account of the loads in the sense of the arrows 26 when the seat is moved forward or backward in the longitudinal direction of the vehicle in a way corresponding to the double-headed arrow 28 in FIG. 1B.

On account of the four load cells 20 that are used, the center of gravity of the person sitting on the sitting area 22 can be established by means of an evaluation circuit and so it can additionally be estimated how great a force bypass is achieved when the feet are placed on the vehicle floor 18.

Figure 2A:
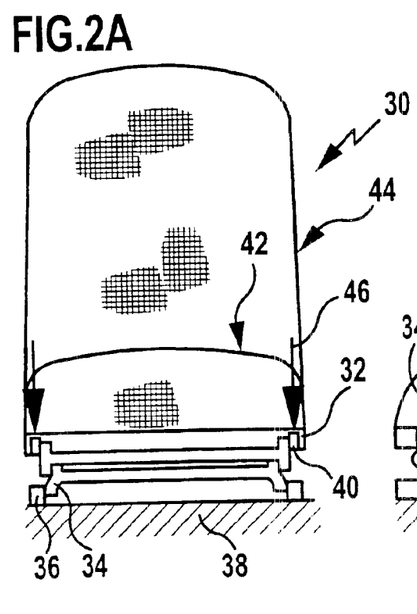
FIGS. 2A and 2B show schematic front and side representations of a vehicle seat according to the invention with a height-adjustable sitting area.
Figure 2B:
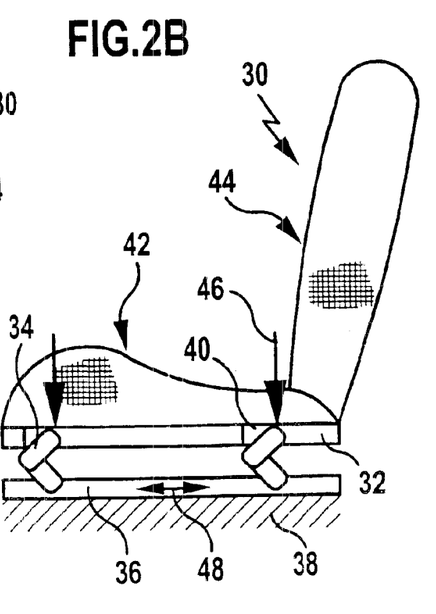

FIGS. 2A and 2B show a vehicle seat 30 in a front view and side view, respectively, with a seat frame 32 and a supporting frame 34. The supporting frame 34 is secured displaceably in the longitudinal direction of the vehicle on rails 36 on a vehicle floor 38. In the present example, the supporting frame 34 is adjustable in height and holds the seat frame 32 at four points. The connection between the supporting frame 34 and the seat frame 32 takes place by means of load cells with a force transducer, the force transducer having a non-deforming part and an elastically deformable part. One of the two parts is mounted on the seat frame 32, the other, respectively, is mounted on the supporting frame 34. Held on the seat frame 32 is a sitting area 42 and also a backrest 44. If a weight then acts on the vehicle seat 30 in the sense of the arrows 46, the weighing signal generated by the load cells 40 remains independent of the height setting of the sitting area 42.

By the load cells 40 being disposed according to the invention at pivot points between the supporting frame and the seat frame, upward shifting of the so-called hip point is avoided. In many designs of seat it is even possible to gain a certain height for the hip point, i.e. the latter can be placed lower than in the original seat design. This avoids the necessity for renewed registration of a vehicle or even only the amendment of a registration of a vehicle on account of the changing of the hip point.

Even a displacement of the vehicle seat 30 in the sense of the double-headed arrow 48 (FIG. 2B) has no influence on the weighing signals determined by the load cells 40.

If the sitting area 42 is tilted forward, i.e. the height adjustment of the supporting frame 34 is performed less at the front than in the rear region, or vice versa, the center of gravity of the person sitting on the seat 30 is automatically shifted as a result. On account of four load cells being disposed on the seat 30, this shifting of the weight can be registered as shifting of the center of gravity, and, on the basis of this, possibly changed force bypasses can be taken into account in the evaluation.

No further details have been given so far concerning the forming of the load cells, which according to the invention are disposed between the seat frame and the supporting frame of the vehicle seat.

Figures 3, 4A:
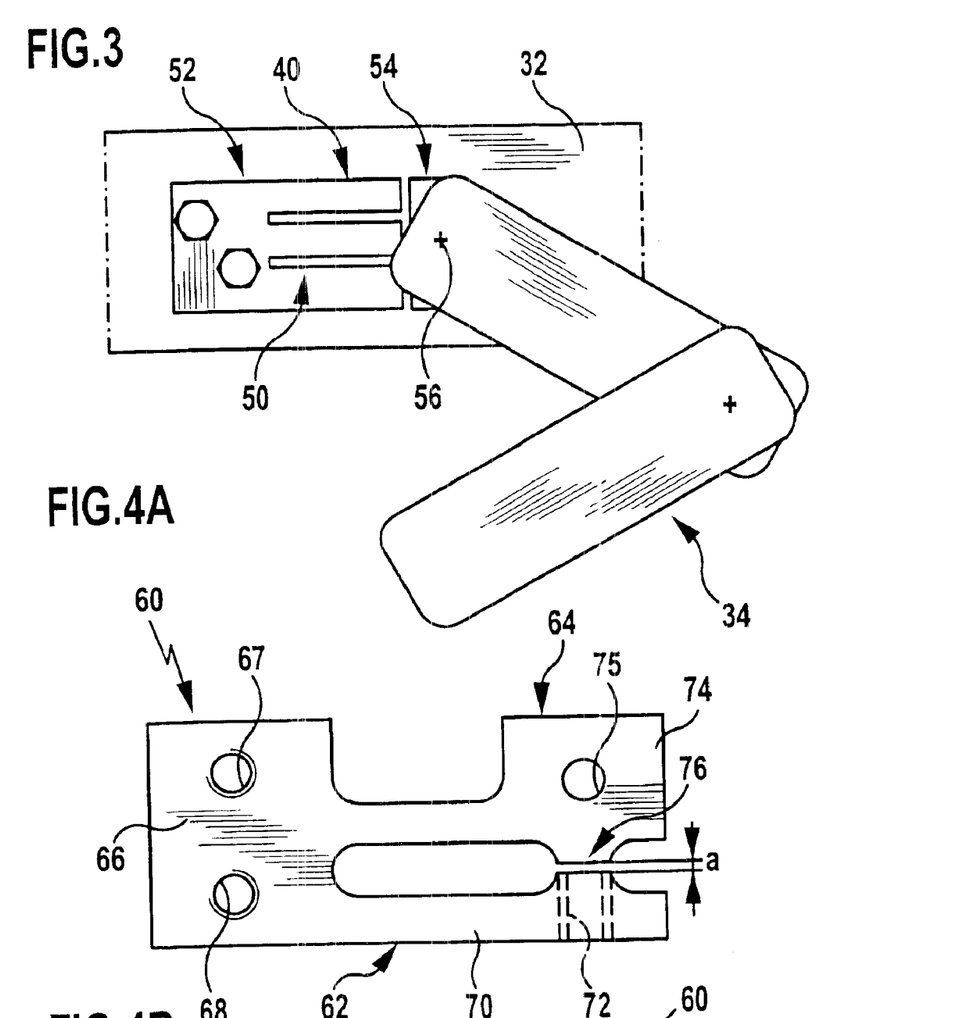
FIG. 3 shows a detailed view of the disposition of a load cell on a vehicle seat according to the invention.
FIGS. 4A and 4B show a side view and a plan view of a load cell of a vehicle seat according to the invention.

On account of the interfering influences which are often to be encountered in motor vehicles, so-called inductive force transducers are suitable in particular as a component part of the load cells, the measured values being obtained as a function of a change in distance. An example of such a force transducer is schematically represented in FIG. 3, which at the same time also serves for further illustration of the mounting of the load cell between the seat frame and the supporting frame. The arrangement shown in FIG. 3 corresponds in principle to the arrangement of FIG. 2A/B, it being possible for this solution to be directly transferred almost unchanged to the solution for the structural design of the seat of FIG. 1A/B.

The load cell 40 in this case comprises a force transducer 50, which operates inductively. The force transducer 50 comprises a non-deforming part 52 and an elastically deformable part 54. In the present exemplary embodiment, the non-deforming part 52 is secured to the seat frame 32 by means of screw bolts, while the elastically deformable part 54 is connected in the region of the pivot point of an adjusting mechanism of the supporting frame 34. As can be easily illustrated by FIG. 3, the mounting principle between the seat-frame force transducer 50 and the supporting frame 34 can also be realized conversely, the non-deforming part 52 of the force transducer 50 then being secured at the pivot point 56 of the supporting frame or its height-adjusting mechanism and the elastically deforming part 54 being connected directly to the seat frame 32.

Figure 4B:
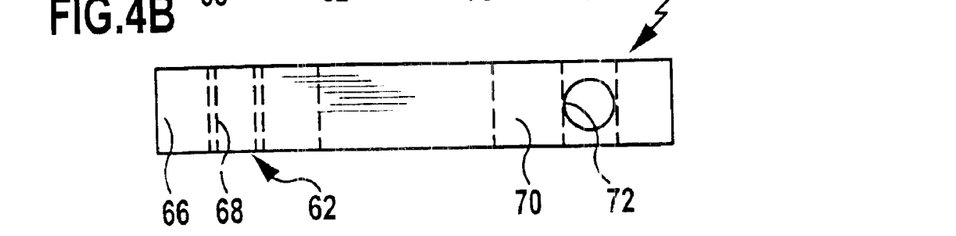

FIGS. 4A and 4B show a further embodiment of a force transducer 60, as can be used in the case of the vehicle seat according to the invention.

The force transducer 60 comprises a non-deforming part 62 and an elastically deformable part 64. The non-deforming part 62 comprises a mounting portion 66, which has two bores 67, 68, and also a signaling part 70, which extends away from the mounting portion 66 and in which a through-bore 72 is provided alongside its free end.

The force transducer 60 is, in its basic form, a rectangular, plate-shaped component, clearances being used to form the elastically deforming part 64 in such a way that it has a mounting portion 74 and a signaling portion 76. The mounting portion 74 comprises a bore 75, via which the elastically deformable part 64 can be connected for example to the supporting frame or else, conversely, to the seat frame.

The signaling face 76 of the elastically deformable part 64 lies opposite the opening of the through-bore 72 of the elongated sensor holding part 70. The spacing a (at the same time the maximum measuring path) between the signaling face 76 and the opening of the through-bore 72 preferably lies in the range of about 1 mm.

The bore 72 can receive a sensor element, as described in more detail below on the basis of FIGS. 4 and 5.

Figures 5, 6:
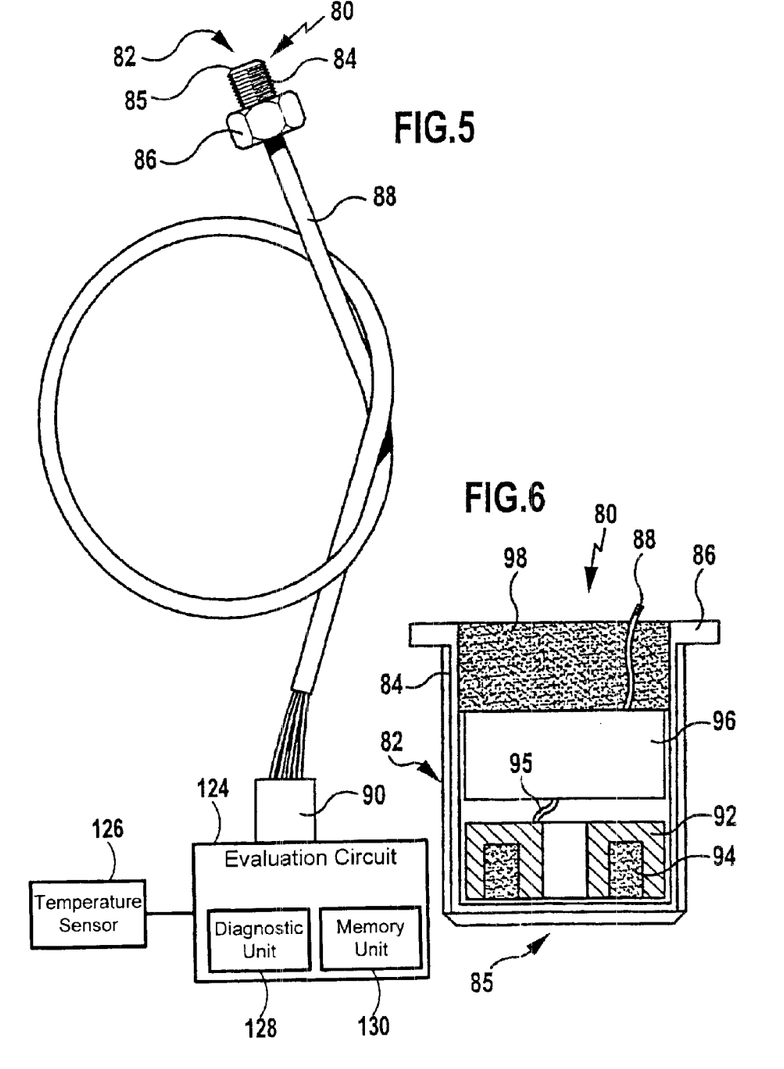
FIG. 5 shows a schematic representation of a sensor for a load cell as shown in FIGS. 4A and 4B.
FIG. 6 shows a side view through a sensor of a load cell used according to the invention.

In particular, the through-bore 72 makes it possible for an inductive sensor to be disposed in the force-transducer part in an encapsulated form, for example by the sensor element disposed in situ being cast with synthetic resin and consequently shielded against ambient influences, or else, as represented in FIG. 5, by the sensor part being fitted into the bore 72 as a separate encapsulated component.

FIG. 5 shows a sensor element 80 with a housing 82, which has on its outer side a thread 84. At its free end 85, the inductive sensor has an encapsulation which is hermetically sealed but permeable to magnetic fields, while at the opposite end of the cylindrical housing a hexagon 86 is formed in such a way as to protrude radially. Connected to this end of the sensor 80 there is then a signal cable 88, which preferably ends in a plug-in connection 90.

The construction of the sensor 80 can be seen more precisely from FIG. 6. This sectional view in the longitudinal direction of the housing 82 of the sensor 80 is the arrangement of an annular pot core 92, which receives a coil 94 in its open recess. The open side of the pot core 92 faces toward the open free end of the housing 82. The housing is hermetically sealed with respect to ambient influences, but permeable to magnetic fields, at the free end 85.

The coil 94 is connected via an electrical line 95 to sensor electronics 96 comprising an oscillator and a level converter, which altogether provide on the output side, via the cable 88, the actual weighing signal of the sensor of the force transducer. On the side of the hexagon 86, the housing 82 is closed by a casting composition 98 and is consequently encapsulated against ambient influences. The sensor 80 can then be screwed with its screw thread 84 into the bore 72 of the force transducer 60 of FIGS. 4A/B, the hexagon 86 at the same time forming a stop and consequently providing a defined seating of the sensor element 80 in the axial direction within the bore 72 of the force transducer 60.

It is clear from the description above that the vehicle seat according to the invention is suitable not only for motor vehicles or automobiles, but also for example as a seat in aircraft, the possibility of performing a very exact estimate of the total mass of the passengers being transported then being provided there. This has advantages in the estimation of the reserves of fuel to be carried or, evaluated differently, in the calculation of an additionally possible cargo load.

The signal cable 88 is connected via the plug-in connection 90 to evaluation circuit 124, which preprocesses the weighing signal of the sensor 80 or of the force transducer 60, possibly with further weighing signals of further load cells mounted on the vehicle seat, and provides the vehicle electronics with a signal which is, for example, a signal differentiating different weight classes and consequently can be used directly for the activation of multiple airbags capable of being fired.

On account of the extreme temperature fluctuations in the interior of a vehicle, which can easily exceed a temperature span of 80° C., it is preferred to connect the evaluation circuit 124 to a temperature sensor 126, the temperature signal of the latter being received by the evaluation circuit 124 and used for the temperature correction of the weighing signals.

Furthermore, the evaluation circuit 124 may comprise a diagnostic unit 128, which performs a check on the functional capability of the load cells at predetermined time intervals or else when predetermined events occur, for example when the motor vehicle is opened. In this way it can be promptly detected whether one of the load cells is producing inconsistent values and so must not be taken into account any longer in a determination of the weight of occupants.

In addition, the evaluation circuit 124 may be provided with a memory unit 130, which may serve for recording the weighing signals of the measuring cells over a predetermined time period and/or recording the output signals and/or the temperature signals.

The memory unit 130 will preferably store results of the preprocessing of the weighing signals, of the diagnostic unit 128, of the signals of the temperature sensor 126 or the temperature sensors and/or peak loading values of the seat frame, possibly together with a time signal.

Figure 7:
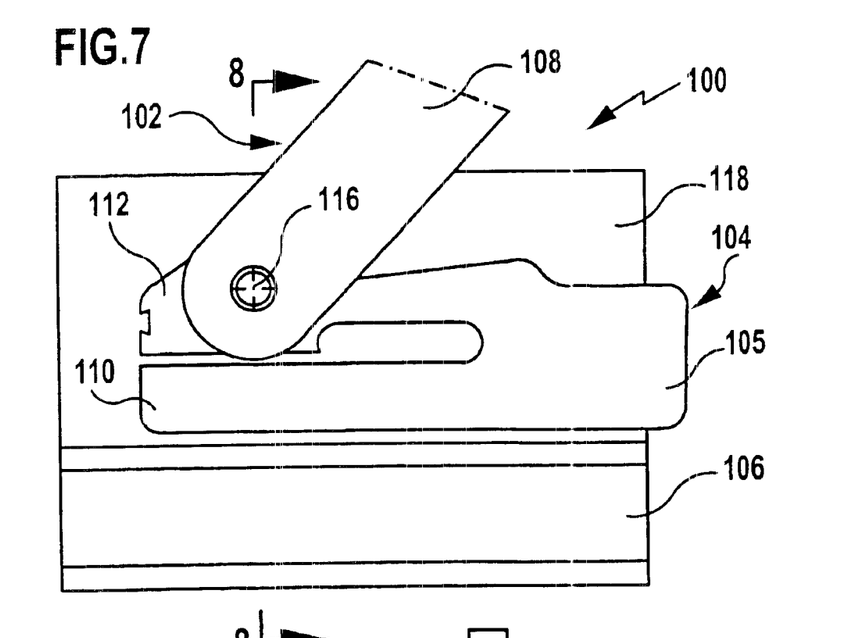
FIG. 7 shows a side view through part of a vehicle seat according to the invention.
Figure 8:
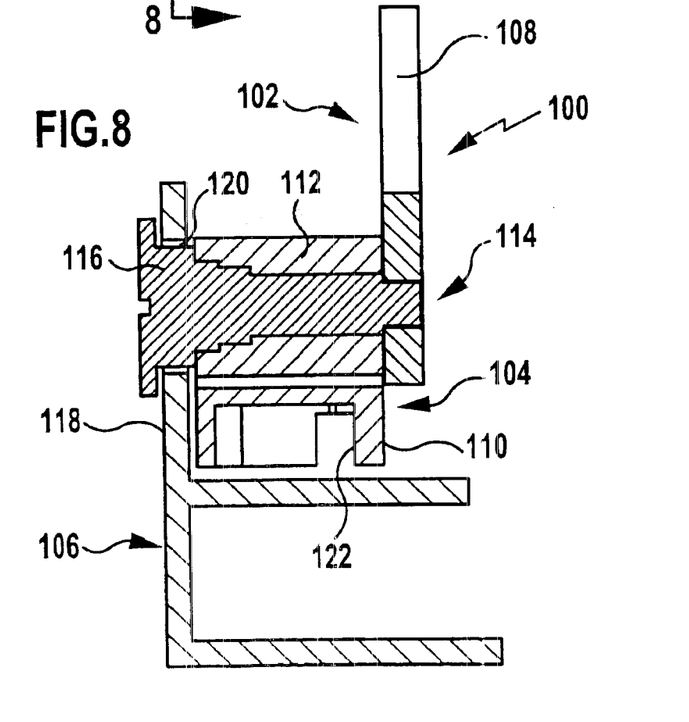
FIG. 8 shows a sectional view along line 8—8 of FIG. 7.

FIGS. 7 and 8 show in part a vehicle seat 100 according to the invention, which comprises a height-adjusting mechanism 102 and is held displaceably in the longitudinal direction of the vehicle on a seat rail (not represented).

In the case of the embodiment of the invention shown in FIGS. 7 and 8, a load cell 104 with its force transducer 105 is disposed between a rail 106 and an articulated lever 108 of the height-adjusting mechanism 102, the rail 106 holding a non-deforming part 110 of the force transducer 105 in such a way that it is fixed to the frame (not specifically represented), for example by means of a screw connection, while an elastically deformable part 112 of the force transducer 105 incorporates a pivot point 114 of the height-adjusting mechanism 102. This pivot point 114 is formed here by the carrying bolt 116, which passes through the elastically deformable part 112 and carries the articulated lever 108 at one end.

At its opposite end, the carrying bolt 116 likewise protrudes beyond the elastically deformable part 112 and passes through a flange 118 protruding vertically upward from the rail 106.

This flange 118 has at the location at which the bolt 116 passes through an opening 120, which is dimensioned such that the bolt can just follow the maximum permissible measuring path of the force transducer. In the case of forces which are greater than the maximum permissible forces in the direction of loading and direction of loading relief, the flange 118 acts with its opening 120 as a mechanical overload protection and prevents these forces from leading to the load cell being damaged.

It can be seen from FIG. 8 that the force transducer 105 has on the side of its non-deforming part 110, which is mounted in such a way that it is fixed to the frame, a recess 122, in which an inductively operating distance sensor and also an oscillator and an associated level converter can be disposed.

What is claimed is:

1. A vehicle seat for supporting a weight and to be supported on a vehicle floor, the vehicle seat comprising a height adjusting mechanism having a pivot point, the vehicle seat further comprising a sitting area for supporting the weight, a seat frame for supporting the sitting area, a supporting frame for supporting the seat frame at a predetermined distance from the vehicle floor and connecting the vehicle seat to the vehicle floor, a height-adjusting device for varying the distance of the seat frame from the vehicle floor, the height adjusting device comprising at least three load cells being spaced apart, non-linearly disposed, and disposed to respond to the weight supported on the sitting area and supply a weighing signal corresponding to the weight, the weighing signal resulting from a distance measurement, the load cells each comprising a one-piece force transducer with an elastically deformable part and a non-deforming part, the non-deforming part being fixed to one of the supporting frame and the pivot point for the height-adjusting mechanism, the elastically deformable part being secured to the other of the seat frame and a pivot point of the height-adjusting mechanism.

2. The vehicle seat according to claim 1, wherein the force transducer is an inductively operating force transducer.

3. The vehicle seat according to claim 1, wherein the supporting frame is disposed on the vehicle floor to be displaceable in a longitudinal direction of the vehicle and optionally fixed in the longitudinal direction.

4. The vehicle seat according to claim 1, wherein the sitting area of the seat disposed on the supporting frame to pivot about an axis disposed transversely in relation to the longitudinal direction of the vehicle.

5. The vehicle seat according to claim 1, wherein the load cells comprise a temperature sensor.

6. The vehicle seat according to claim 1, wherein the load cells are connected to an evaluation circuit, said evaluation circuit preprocessing said weighing signals and providing an output signal at an interface for the electronics of the vehicle.

7. The vehicle seat according to claim 6, wherein the output signal is a signal which designates one of a number of predetermined weight classes.

8. The vehicle seat according to claim 6, wherein the evaluation circuit is connected to a temperature sensor which produces a temperature signal, the evaluation circuit receiving the temperature signal and making a temperature correction of the weighing signals.

9. The vehicle seat according to claim 6, wherein the evaluation circuit is formed in such a way that it evaluates the weighing signals of at least a portion of the load cells to determine the center of gravity of the load acting on the sitting area.

10. The vehicle seat according to claim 6, wherein the evaluation circuit comprises a diagnostic unit, said diagnostic unit performing a check on functional capability of the load cells at predetermined time intervals or when predetermined events occur.

11. The vehicle seat according to claim 8, wherein the evaluation circuit comprises a memory unit for recording the weighing signals of the load cells over a predetermined time period.

12. The vehicle seat according to claim 11, wherein the memory unit comprises memory areas for storing results of at least a portion of the preprocessing of the weighing signals, of the signals of the diagnostic unit, of the signals of the temperature sensor and/or peak loading values of the weighing signals of the force transducers, optionally comprising additional memory areas in which corresponding time signals can be stored.

13. The vehicle seat according to claim 1, wherein the vehicle seat comprises a mechanical overload protection, said mechanical overload protection limiting the relative movement of the elastically deformable parts of the force transducers with respect to the non-deforming parts.

14. The vehicle seat according to claim 13, wherein the mechanical overload protection comprises a stop in the direction of loading and a stop in the direction of loading relief.

15. The vehicle seat according to claim 14, wherein at least one of the stops is secured to at least one of the seat frame and the supporting frame.

* * * * *